United States Patent
Dickinson et al.

(10) Patent No.: US 9,140,339 B1
(45) Date of Patent: Sep. 22, 2015

(54) ROTATIONAL ASSIST DRIVE MECHANISM

(71) Applicants: Todd Dickinson, Hopatcong, NJ (US); Michael N. Norris, Highland Lakes, NJ (US); Lewis F. Campanile, Denville, NJ (US); Frank Petrosillo, West Milford, NJ (US); Bryan W. Anderson, Andover, NJ (US)

(72) Inventors: Todd Dickinson, Hopatcong, NJ (US); Michael N. Norris, Highland Lakes, NJ (US); Lewis F. Campanile, Denville, NJ (US); Frank Petrosillo, West Milford, NJ (US); Bryan W. Anderson, Andover, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 262 days.

(21) Appl. No.: 13/687,381

(22) Filed: Nov. 28, 2012

(51) Int. Cl.
    *F16H 7/06* (2006.01)
    *F41H 5/20* (2006.01)
    *F16H 7/18* (2006.01)

(52) U.S. Cl.
    CPC .. *F16H 7/18* (2013.01); *F16H 7/06* (2013.01); *F41H 5/20* (2013.01)

(58) Field of Classification Search
    CPC ........................................................ F41H 5/20
    USPC .................. 74/89.21; 89/36.13, 36.14, 41.01, 89/41.02; 414/687, 694; 212/246; 474/139
    See application file for complete search history.

(56) References Cited

U.S. PATENT DOCUMENTS

| | | | | | |
|---|---|---|---|---|---|
| 1,877,338 | A | * | 9/1932 | Kottlowski | 474/139 |
| 2,217,037 | A | * | 10/1940 | Abramoska | 474/87 |
| 2,437,646 | A | * | 3/1948 | Matulaitis et al. | 318/367 |
| 3,399,578 | A | * | 9/1968 | Lindabury, Sr. et al. | 74/89.21 |
| 3,469,464 | A | * | 9/1969 | Peterson et al. | 474/139 |
| 3,661,352 | A | * | 5/1972 | McFarlane | 248/429 |
| 3,672,237 | A | * | 6/1972 | Nagin | 74/89.21 |
| 4,361,220 | A | * | 11/1982 | Kraft | 198/330 |
| 4,753,338 | A | * | 6/1988 | Ketonen | 198/692 |

FOREIGN PATENT DOCUMENTS

EP    0 156 946    * 10/1985

* cited by examiner

*Primary Examiner* — William C Joyce
(74) *Attorney, Agent, or Firm* — Henry S. Goldfine

(57) ABSTRACT

A turret includes a rotary bearing with an inner race, an outer race and a central axis of rotation. An internal tooth drive sprocket is fixed to the outer race of the bearing and centered on the central axis of rotation of the bearing. A turret plinth is fixed to the inner race of the bearing. A drive mechanism for rotating the turret plinth with respect to the internal tooth drive sprocket includes first and second sprocket assemblies each having a pair of upper and lower external tooth sprockets fixed to a shaft. The middle chain row of a triple roller chain engages the internal tooth drive sprocket. One of the outer chain rows engages the upper sprockets of the first and second sprocket assemblies and the other of the outer chain rows engages the lower sprockets of the first and second sprocket assemblies. Hand wheels connected to the shafts of the sprocket assemblies provide input motion to the drive mechanism.

10 Claims, 5 Drawing Sheets

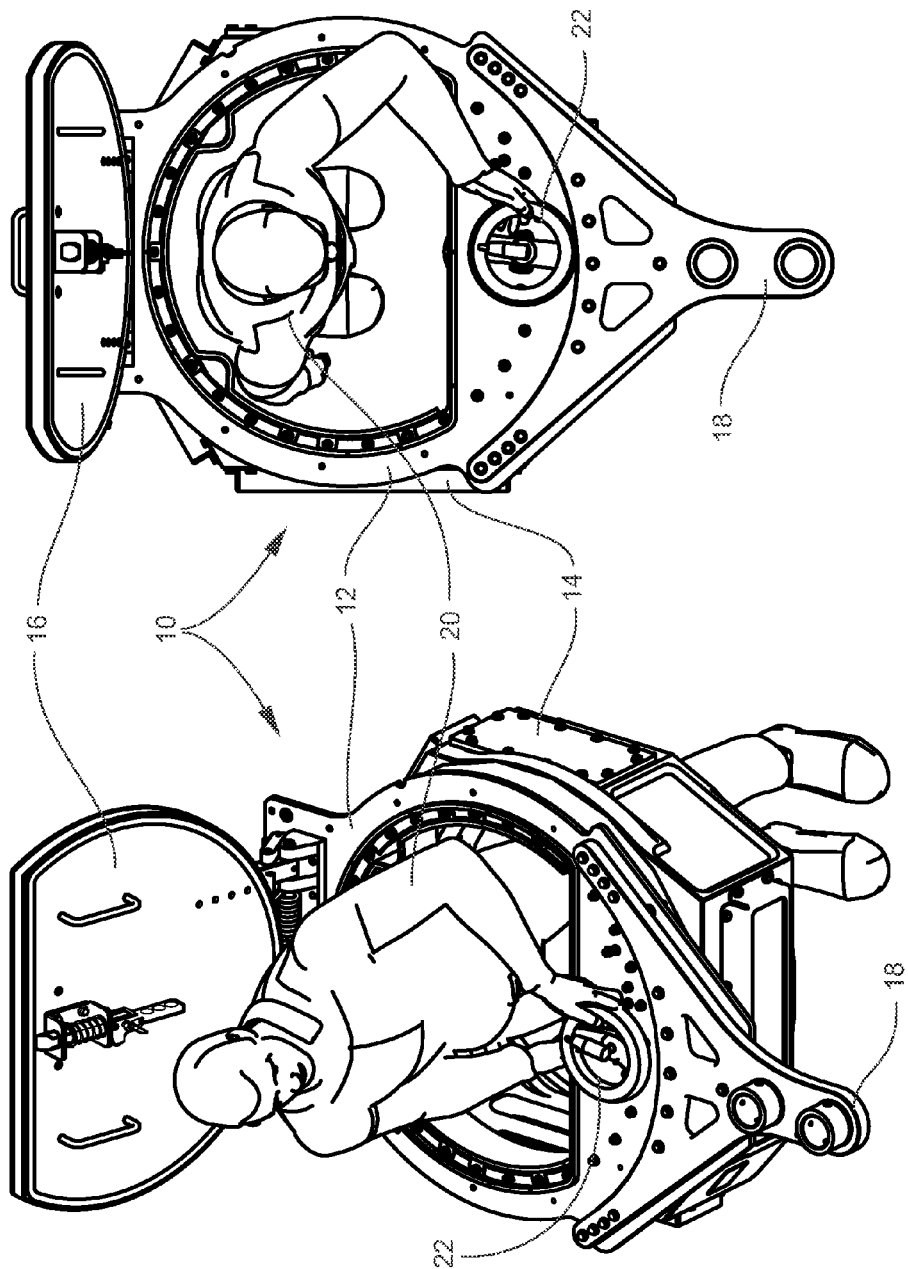

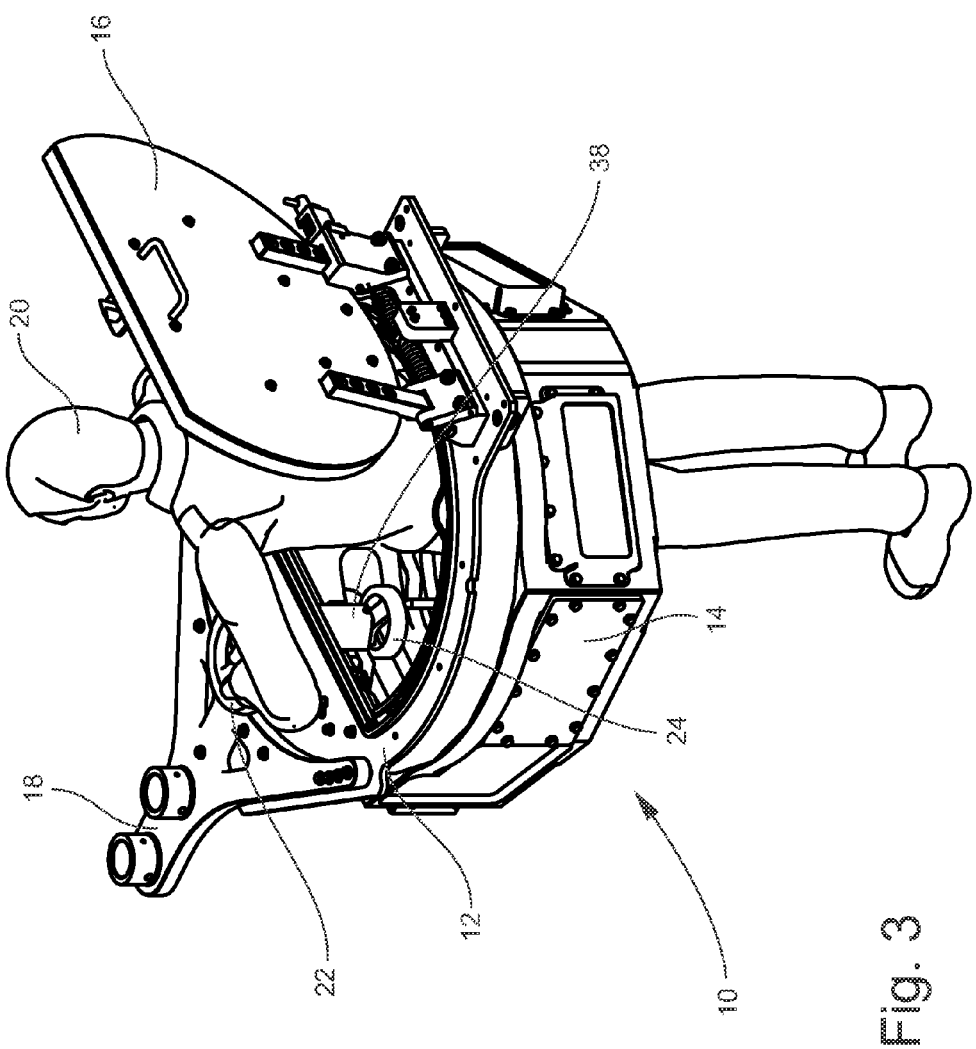

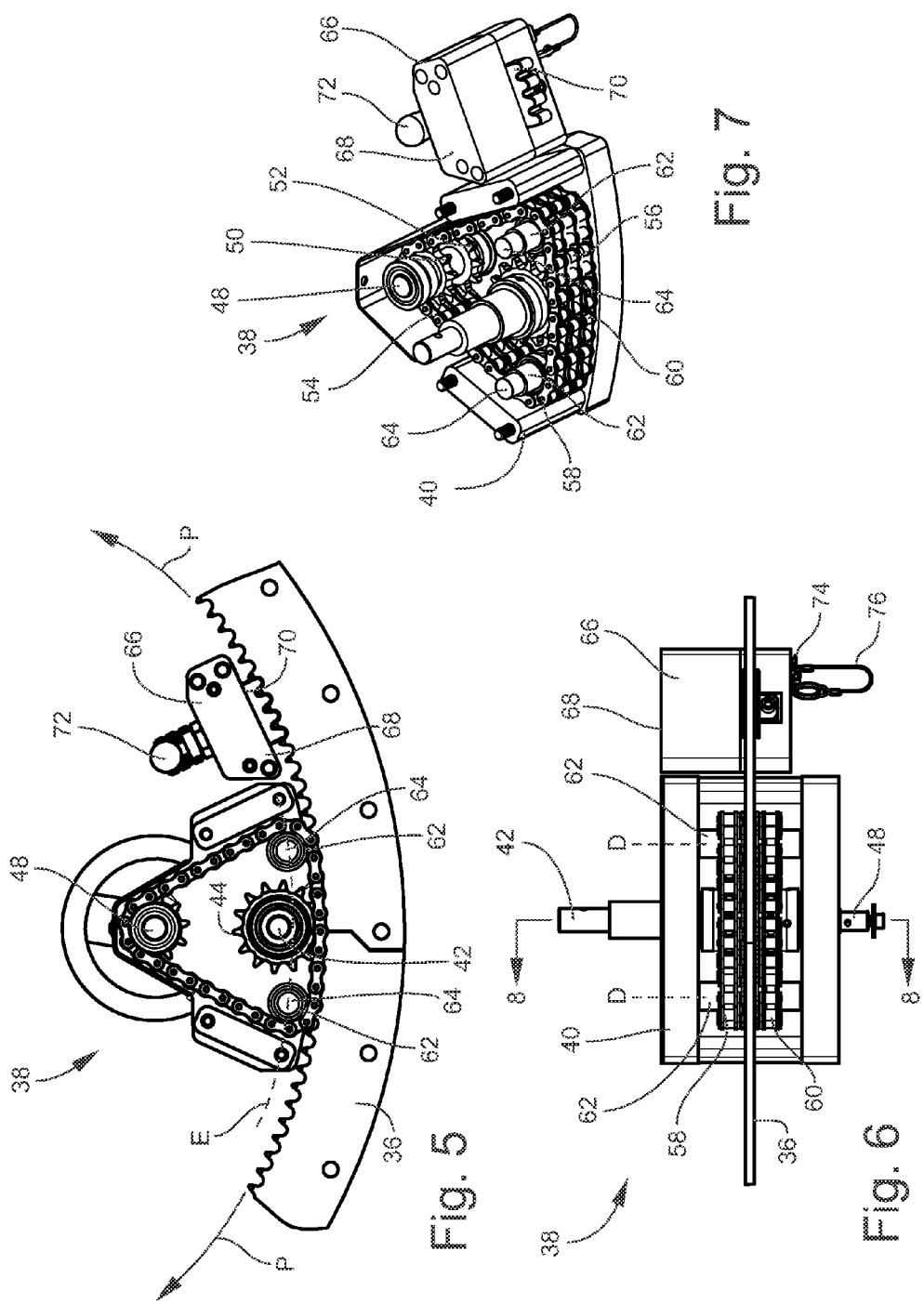

ROTATIONAL ASSIST DRIVE MECHANISM

STATEMENT OF GOVERNMENT INTEREST

The inventions described herein may be manufactured, used and licensed by or for the United States Government.

BACKGROUND OF THE INVENTION

The invention relates in general to mechanical drive systems and in particular to mechanical drive systems for rotating turrets.

U.S. Pat. No. 6,101,917 issued to Klatte et al. on Aug. 15, 2000 discloses a mechanical assist turret drive system comprised of a turret drive assembly that rotates inside of an internal tooth fixed ring gear. The turret drive assembly is driven manually via an aiming wheel, input shaft, bevel gear mesh, shafted sprockets driven by a chain and an output gear that meshes with the internal tooth fixed ring gear. The system also provides means to disengage the drive system if the user decides to rotate the turret by hand.

However, because of the large amount of friction, manually rotating the turret by hand when the drive system is disengaged may be difficult or impossible, especially for those with lesser strength. In addition, the disengage components may not ensure a precise and consistent center distance in the gear mesh, which contributes to excessive backlash. Also, the use of a large number of drive components causes unnecessary friction and backlash. The drive system only provides single tooth to tooth contact in the pinion and ring gear mesh.

A need exists for a drive system that is less complex, has a fewer number of components, and has less backlash and friction than known systems.

SUMMARY OF INVENTION

One aspect of the invention is a turret that includes a rotary bearing having an inner race, an outer race and a central axis of rotation. An internal tooth drive sprocket is fixed to the outer race of the bearing and centered on the central axis of rotation of the bearing. A turret plinth is fixed to the inner race of the bearing.

A drive mechanism for rotating the turret plinth with respect to the internal tooth drive sprocket includes a housing fixed to the turret plinth. A first sprocket assembly has a shaft with a longitudinal axis parallel to the central axis of rotation and rotatably fixed to the housing, and upper and lower external tooth sprockets fixed to the shaft. A second sprocket assembly has a shaft with a longitudinal axis parallel to the central axis of rotation and rotatably fixed to the housing, and upper and lower external tooth sprockets fixed to the shaft. A triple roller chain has upper, middle, and lower chain rows. The middle chain row engages the internal tooth drive sprocket. The upper chain row engages the upper sprockets of the first and second sprocket assemblies. The lower chain row engages the lower sprockets of the first and second sprocket assemblies.

The internal tooth drive sprocket may define a pitch circle. The drive mechanism may include a pair of guide rollers disposed on opposite sides of the first sprocket assembly for guiding the triple roller chain, the guide rollers having central longitudinal axes that are parallel to the central axis of rotation.

In a plane normal to the central axis of rotation, a circular arc that connects the central longitudinal axes of the pair of guide rollers is concentric with the pitch circle of the internal tooth drive sprocket.

Each guide roller may include a shaft fixed to the housing.

The drive mechanism may include a positive locking mechanism for preventing rotation of the turret plinth with respect to the internal tooth drive sprocket. The positive locking mechanism may include a housing that is fixed to the turret plinth. The positive locking mechanism may include teeth that are selectively engageable with the internal tooth drive sprocket. The positive locking mechanism may include a pivoting handle for selectively engaging the teeth of the positive locking mechanism with the internal tooth drive sprocket.

A hand wheel may be fixed to an end of the shaft of the first sprocket assembly. Another hand wheel may be fixed to an end of the shaft of the second sprocket assembly. The two hand wheels may be located on opposite sides of a plane that is normal to the central axis of rotation and defined by the internal tooth drive sprocket.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

FIG. 1 is a front perspective view of one embodiment of a turret with a rotational assist drive mechanism.

FIG. 2 is a top view of FIG. 1.

FIG. 3 is a rear perspective view of FIG. 1.

FIG. 5 is a top view of FIG. 4 with the top housing of the rotational assist drive mechanism removed for clarity.

FIG. 6 is a front view of FIG. 4.

FIG. 7 is a perspective view of one embodiment of a rotational assist drive mechanism with the top housing removed for clarity.

DETAILED DESCRIPTION

Figure 4:
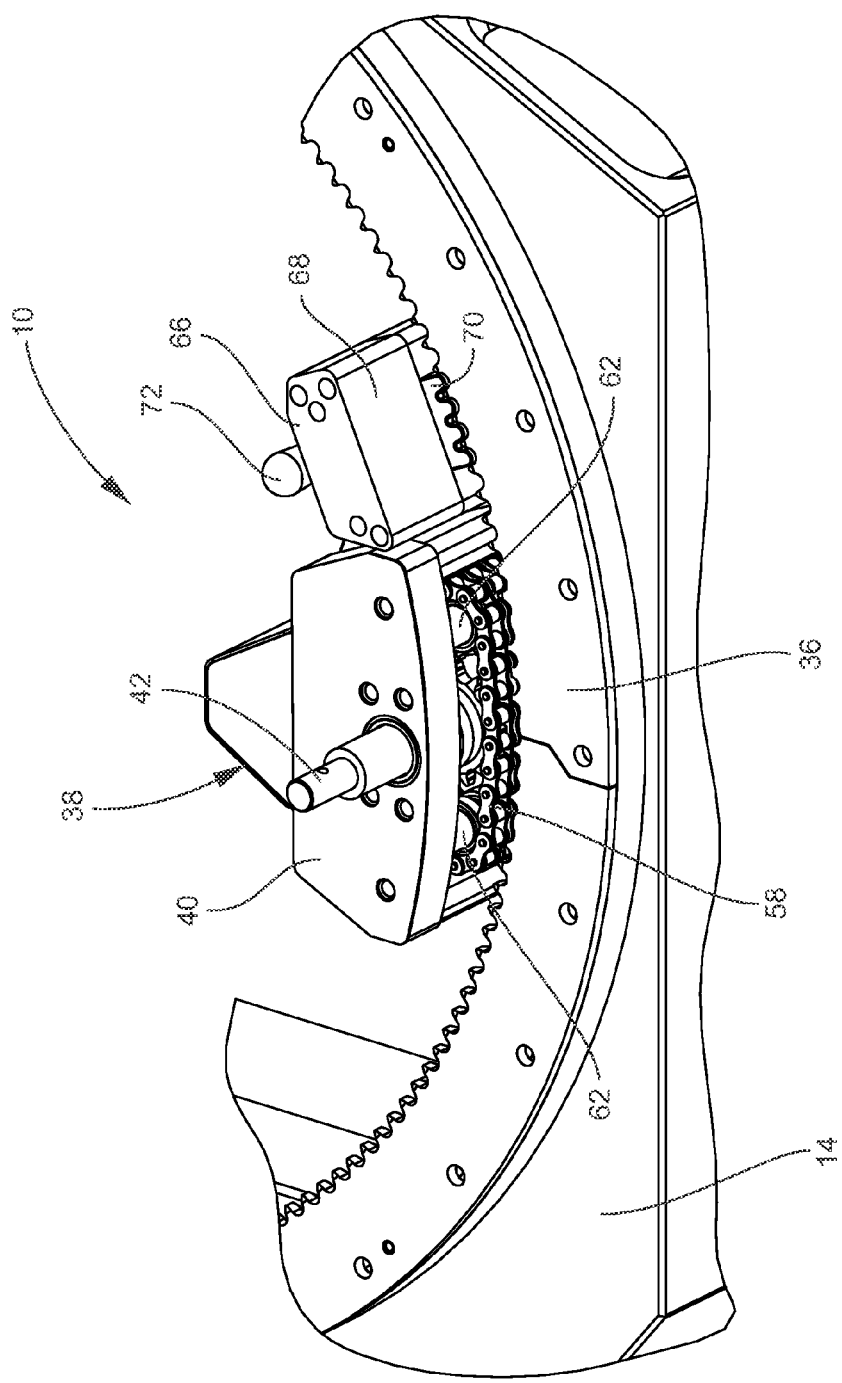
FIG. 4 is a partial perspective view of the turret of FIG. 1 with the turret plinth and turret bearing removed for clarity.

A novel rotational assist drive mechanism may be used to rotate a turret. The turret may be, for example, mounted on a vehicle or other structure. An internal tooth ring sprocket may be fixed to the vehicle or other structure. The outer race of a large diameter ball bearing is attached to the fixed internal tooth ring sprocket. A turret plinth is attached to the inner race of the large diameter ball bearing. The turret plinth rotates with respect to the internal tooth ring sprocket. The rotational assist drive mechanism is supported by the turret plinth.

The novel drive mechanism may include dual input hand wheels. The hand wheels may be vertically oriented and situated to not intrude on the egress opening of the turret hatch. A user or operator can stand within the egress opening and rotate an input hand wheel with one hand while operating a weapon with the other hand. The hand wheel enables rotation of the turret plinth 360 degrees within the internal tooth ring sprocket. An operator can also rotate the turret plinth from inside the vehicle with the hatch closed, using a second input hand wheel. In the context of a turret on a military vehicle, the dual drive inputs enable operation of the mechanism if the user is sling-seated with the hatch open, or inside the vehicle with the hatch closed. In an emergency situation when the user is under fire, the user may have to retreat inside the vehicle and close the hatch. The turret can be rotated from inside the vehicle, thereby enabling the user to optimally position a weapon.

The input hand wheels drive a triple roller chain using respective pairs of shafted sprockets that engage the outer rows of the triple roller chain. The opposing internal tooth ring sprocket engages the center row of the triple roller chain. The chain may travel around guide rollers that emulate the pitch circle of the internal tooth ring sprocket. In this way, multiple rollers of the chain engage the internal teeth of the ring sprocket simultaneously.

The novel rotational assist drive mechanism does not require the disengage feature of prior art systems because the novel system greatly reduces friction and backlash. Manual rotation of the new system by hand will easily back-feed through the system. The novel drive mechanism may also include a rotation lock mechanism to ensure that the turret will not rotate unintentionally. For example, some vehicle-mounted turrets may rotate unintentionally while the vehicle is in transit.

FIG. 1 is a front perspective view of one embodiment of a turret 10 with a rotational assist drive mechanism. FIG. 2 is a top view of FIG. 1 and FIG. 3 is a rear perspective view of FIG. 1. A turret plinth 12 rotates with respect to, for example, a vehicle bulkhead 14 or other structure. Turret plinth 12 may include a hatch cover 16 and a weapon mount 18. An operator or user 20 may stand inside plinth 12. User 20 may rotate turret plinth 12 using an upper hand wheel 22 or a lower hand wheel 24 (FIG. 3). Lower hand wheel 24 may be used with user 20 positioned inside of closed hatch cover 16. The rear portion of a rotational drive assist mechanism 38 is shown in FIG. 3.

Figures 8, 9:
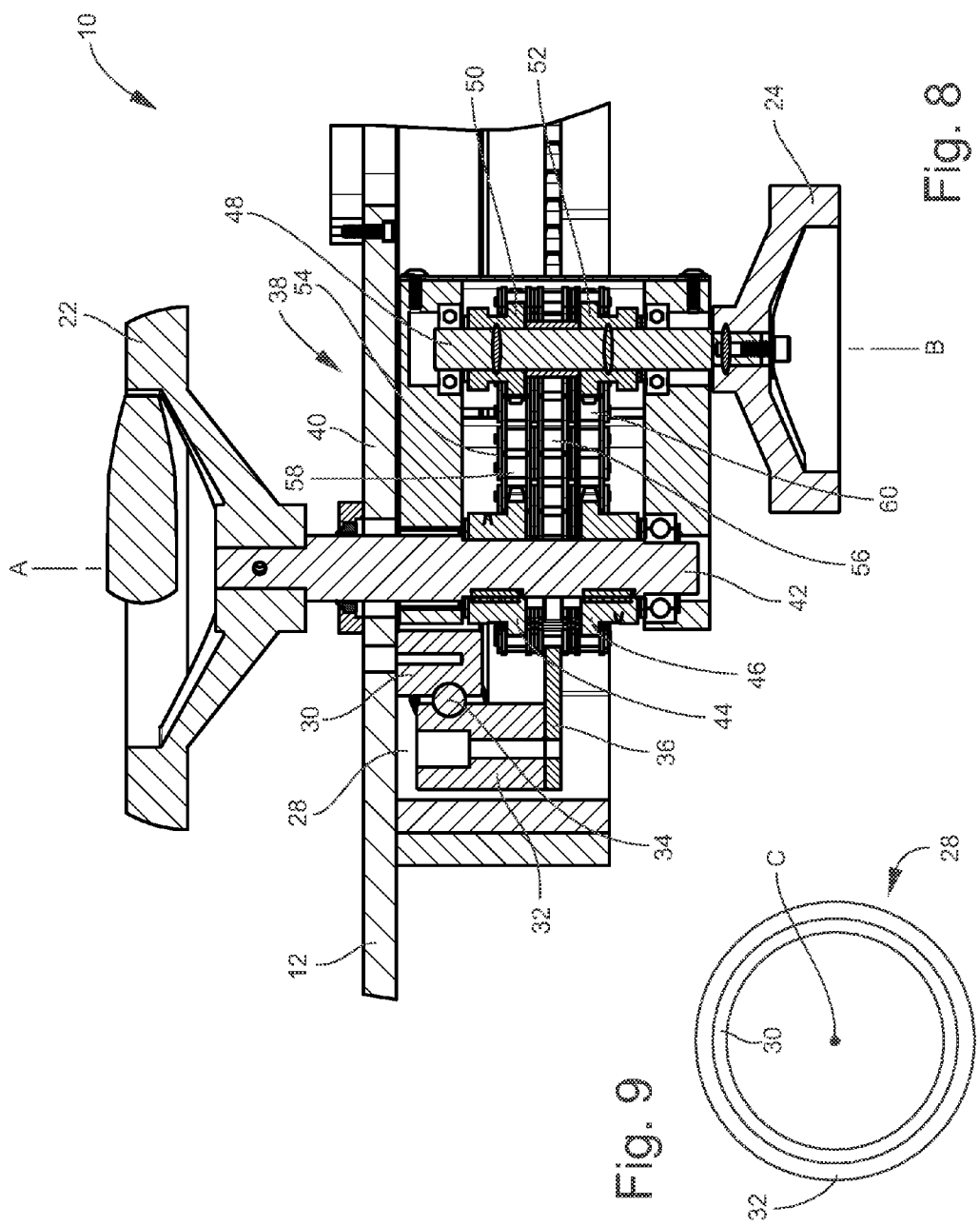
FIG. 8 is a sectional view taken along the line 8-8 of FIG. 6, with hand wheels included.
FIG. 9 is a schematic view of a rotary ball bearing.

As seen in the sectional view of FIG. 8, a large diameter rotary ball bearing 28 includes an inner race 30, an outer race 32, and a plurality of balls 34 disposed between inner race 30 and outer race 32. Bearing 28 has a central axis of rotation C (FIG. 9). An internal tooth drive sprocket 36 is fixed to outer race 32 and centered on central axis of rotation C. Turret plinth 12 is fixed to inner race 30.

The rotational drive assist mechanism 38 for rotating turret plinth 12 with respect to internal drive sprocket 36 includes a housing 40 fixed to turret plinth 12. Mechanism 38 includes a first sprocket assembly having a shaft 42 with a longitudinal axis A parallel to central axis of rotation C. Shaft 42 is rotatably fixed to housing 40. Upper and lower external tooth sprockets 44, 46 are fixed to shaft 42. A second sprocket assembly has a shaft 48 with a longitudinal axis B that is parallel to central axis of rotation C. Shaft 48 is rotatably fixed to housing 40. Upper and lower external tooth sprockets 50, 52 are fixed to shaft 48.

Mechanism 38 includes a triple roller chain 54 having a center or middle chain row 56 and two outer chain rows 58, 60. As oriented in FIG. 8, outer chain row 58 is the upper chain row and outer chain row 60 is the lower chain row. Middle chain row 56 engages the teeth of internal tooth drive sprocket 36. Upper chain row 58 engages upper sprockets 44, 50 of the first and second sprocket assemblies and lower chain row 60 engages lower sprockets 46, 52 of the first and second sprocket assemblies.

As seen in FIG. 8, hand wheel 22 may be fixed to shaft 42 and hand wheel 24 may be fixed to shaft 48. Rotation of either hand wheel 22, 24 causes rotation of turret plinth 12 with respect to internal tooth drive sprocket 36. In the turret 10 shown in FIGS. 1-3, hand wheel 22 may be located externally for use when hatch cover 16 is open, and hand wheel 24 (FIG. 3) may be located internally for use when hatch cover 16 is closed. In general, hand wheels 22, 24 may be disposed on opposite sides of the plane of internal tooth drive sprocket 36, although other arrangements are possible.

As seen in FIG. 4-7, mechanism 38 includes a pair of guide rollers 62 disposed on opposite sides of the first sprocket assembly or shaft 42. Guide rollers 62 contact and guide the three chain rows 56, 58, 60 (FIG. 7) of triple roller chain 54. Guide rollers 62 have central longitudinal axes D (FIG. 6) that are parallel to central axis of rotation C. Guide rollers 62 may be mounted on shafts 64 (FIG. 5) that are fixed to housing 40. Guide rollers 62 may include ball bearings therein for ease of rotation.

As seen in FIG. 5, internal tooth drive sprocket 36 defines a pitch circle P. In a plane normal to central axis of rotation C (for example, the plane of the view in FIG. 5), a circular arc E that connects the central longitudinal axes D, D of guide rollers 62 is concentric with or substantially concentric with pitch circle P of internal tooth drive sprocket 36.

Mechanism 38 may include a positive locking mechanism 66 for preventing rotation of turret plinth 12 with respect to internal tooth drive sprocket 36. Positive locking mechanism 66 may include a housing 68 that is fixed to turret plinth 12. Locking mechanism 66 includes teeth 70 that are selectively engageable with internal tooth drive sprocket 36. A pivoting handle 72 connected to teeth 70 may be used to selectively engage teeth 70 with internal tooth drive sprocket 36. The engaged and disengaged positions of teeth 70 with sprocket 36 may be positively locked using a pin 74 inserted in an opening (not shown) in mechanism 38. A lanyard 76 may be fixed to housing 68 and pin 74.

While the invention has been described with reference to certain embodiments, numerous changes, alterations and modifications to the described embodiments are possible without departing from the spirit and scope of the invention as defined in the appended claims, and equivalents thereof.

What is claimed is:

1. A turret, comprising:
   a rotary bearing having an inner race, an outer race and a central axis of rotation;
   an internal tooth drive sprocket fixed to the outer race of the bearing and centered on the central axis of rotation of the bearing;
   a turret plinth fixed to the inner race of the bearing; and
   a drive mechanism for rotating the turret plinth with respect to the internal tooth drive sprocket, the drive mechanism including
      a housing fixed to the turret plinth;
      a first sprocket assembly having a shaft with a longitudinal axis parallel to the central axis of rotation and rotatably fixed to the housing, and upper and lower external tooth sprockets fixed to the shaft;
      a second sprocket assembly having a shaft with a longitudinal axis parallel to the central axis of rotation and rotatably fixed to the housing, and upper and lower external tooth sprockets fixed to the shaft;
      a triple roller chain having upper, middle, and lower chain rows wherein the middle chain row only engages the internal tooth drive sprocket, the upper chain row only engages the upper sprockets of the first and second sprocket assemblies and the lower chain row only engages the lower sprockets of the first and second sprocket assemblies; and
   wherein the internal tooth drive sprocket has a pitch circle and the drive mechanism further comprises a pair of guide rollers disposed on opposite sides of the first sprocket assembly for guiding the triple roller chain, the guide rollers having central longitudinal axes that are parallel to the central axis of rotation.

2. The turret of claim 1, wherein, in a plane normal to the central axis of rotation, a circular arc that connects the central longitudinal axes of the pair of guide rollers is concentric with the pitch circle of the internal tooth drive sprocket.

3. The turret of claim 2, wherein each guide roller includes a shaft fixed to the housing.

4. The turret of claim 3, further comprising a hand wheel fixed to an end of the shaft of the first sprocket assembly.

5. The turret of claim 4, further comprising a second hand wheel fixed to an end of the shaft of the second sprocket assembly.

6. The turret of claim 5, wherein the hand wheel and the second hand wheel are located on opposite sides of a plane that is normal to the central axis of rotation and defined by the internal tooth drive sprocket.

7. A rotational assist drive mechanism for a turret having a rotary bearing with an inner race, an outer race and a central axis of rotation; an internal tooth drive sprocket fixed to the outer race of the bearing and centered on the central axis of rotation of the bearing; and a turret plinth fixed to the inner race of the bearing; the rotational assist drive mechanism comprising:
 a housing fixed to the turret plinth;
 a first sprocket assembly having a shaft with a longitudinal axis parallel to the central axis of rotation and rotatably fixed to the housing, and upper and lower external tooth sprockets fixed to the shaft;
 a second sprocket assembly having a shaft with a longitudinal axis parallel to the central axis of rotation and rotatably fixed to the housing, and upper and lower external tooth sprockets fixed to the shaft;
 a triple roller chain having upper, middle, and lower chain rows wherein the middle chain row only engages the internal tooth drive sprocket, the upper chain row only engages the upper sprockets of the first and second sprocket assemblies and the lower chain row only engages the lower sprockets of the first and second sprocket assemblies; and
 wherein the internal tooth drive sprocket defines a pitch circle, the mechanism further comprising a pair of guide rollers disposed on opposite sides of the first sprocket assembly for guiding the triple roller chain, the guide rollers having central longitudinal axes that are parallel to the central axis of rotation.

8. The mechanism of claim 7, wherein, in a plane normal to the central axis of rotation, a circular arc that connects the central longitudinal axes of the pair of guide rollers is concentric with the pitch circle of the internal tooth drive sprocket.

9. The mechanism of claim 8, wherein each guide roller includes a shaft fixed to the housing.

10. The mechanism of claim 7, further comprising a hand wheel fixed to an end of the shaft of the first sprocket assembly and a second hand wheel fixed to an end of the shaft of the second sprocket assembly.

\* \* \* \* \*